(12) United States Patent
Shmilovich

(10) Patent No.: US 11,414,177 B2
(45) Date of Patent: Aug. 16, 2022

(54) FLUIDIC ACTUATOR FOR AIRFOIL

(71) Applicant: The Boeing Company, Chicago, IL (US)

(72) Inventor: Arvin Shmilovich, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 771 days.

(21) Appl. No.: 16/127,968

(22) Filed: Sep. 11, 2018

(65) Prior Publication Data

US 2020/0079499 A1 Mar. 12, 2020

(51) Int. Cl.
| | |
|---|---|
| *B64C 21/04* | (2006.01) |
| *F04D 29/28* | (2006.01) |
| *F04D 29/44* | (2006.01) |
| *F04D 29/40* | (2006.01) |
| *F04D 25/04* | (2006.01) |
| *F01D 1/32* | (2006.01) |
| *F01D 25/24* | (2006.01) |
| *F04D 17/16* | (2006.01) |
| *F15D 1/12* | (2006.01) |

(52) U.S. Cl.
CPC ................ *B64C 21/04* (2013.01); *F01D 1/32* (2013.01); *F01D 25/24* (2013.01); *F04D 17/16* (2013.01); *F04D 25/045* (2013.01); *F04D 29/281* (2013.01); *F04D 29/403* (2013.01); *F04D 29/442* (2013.01); *B64C 2230/04* (2013.01); *F15D 1/12* (2013.01)

(58) Field of Classification Search
CPC ... B64C 21/04; B64C 2230/04; F04D 29/281; F04D 29/442; F04D 29/403; F04D 25/045; F04D 17/16; F04D 29/382; F04D 29/684; F01D 1/32; F01D 25/24; F15D 1/12; F15D 1/008; Y02T 50/10; F02C 6/08
See application file for complete search history.

(56) References Cited

U.S. PATENT DOCUMENTS

| | | | | |
|---|---|---|---|---|
| 3,584,811 | A | * | 6/1971 | Leavy ................... B64C 23/005 244/207 |
| 5,875,627 | A | * | 3/1999 | Jeswine .................. B64C 23/02 60/201 |
| 5,988,522 | A | * | 11/1999 | Glezer .................... B64C 21/08 239/11 |
| 7,617,670 | B2 | | 11/2009 | Truax et al. |

(Continued)

*Primary Examiner* — Assres H Woldemaryam
(74) *Attorney, Agent, or Firm* — Quinn IP Law

(57) ABSTRACT

A fluidic actuator is configured to be mounted to an airfoil surface. The actuator includes a rotor supported within a housing. The rotor contains at least one generally radially extending nozzle that converges from an entry at an interior circumference of the rotor to an exit at an exterior circumference thereof, the converging shape of the nozzle assuring high velocity airflow at the nozzle exit. In one form, each nozzle also includes a curved path by which high-pressure air is enabled to induce spinning of the rotor. The fluidic actuator further includes a diffuser through which high-pressure air from the nozzles is cyclically ejected from those of the nozzles instantaneously exposed to the diffuser. In one form, the rotor spins at 300 revolutions per second and provides nozzle ejections effective to avoid boundary layer separation; i.e. to maintain an attached boundary layer flow over the airfoil.

20 Claims, 4 Drawing Sheets

(56) References Cited

U.S. PATENT DOCUMENTS

| | | | |
|---|---|---|---|
| 8,827,212 B1* | 9/2014 | Shmilovich | B64C 21/08 |
| | | | 244/207 |
| 9,108,725 B1* | 8/2015 | Shmilovich | B64C 21/04 |
| 9,157,368 B2 | 10/2015 | Hurwitz et al. | |
| 9,184,109 B2* | 11/2015 | Poynot | H05B 33/08 |
| 9,278,753 B2 | 3/2016 | Reckzeh et al. | |
| 9,511,849 B2* | 12/2016 | Shmilovich | B64C 21/04 |
| 9,656,740 B2 | 5/2017 | Golling | |
| 9,725,160 B2 | 8/2017 | Golling et al. | |
| 2011/0024574 A1* | 2/2011 | Lorkowski | B64C 21/04 |
| | | | 244/206 |
| 2015/0239552 A1* | 8/2015 | Nikic | B64C 21/04 |
| | | | 244/207 |
| 2018/0134373 A1* | 5/2018 | Reckzeh | F15D 1/008 |

* cited by examiner

FLUIDIC ACTUATOR FOR AIRFOIL

FIELD

The present disclosure relates generally to aircraft flight control systems, and more specifically to controlling boundary layer interactions with airfoils to enhance aerodynamic performance.

BACKGROUND

Take-off and/or landing configurations of modern aircraft are designed to assure aerodynamically optimized and stable flight performance during slower flight speeds. Aircraft designers have developed various strategies for achieving airfoil performance objectives, including use of various deployable devices attached to aircraft wings, some of the more common being known as slats and flaps.

Recent efforts have focused on influencing boundary layers of wings and flaps by artificially introducing disruptive cyclic jets of air from airfoils into the boundary layers. These systems are based on suction/blowing and/or periodic blowing mechanisms that require pluralities of openings, such as slots, situated within wing surfaces to help to retain attached boundary layer flows over slower moving airfoils, particularly at speeds relatively close to stall, to avoid boundary layer separation. Although such systems have realized modest amounts of success, most have generally tended to be extremely expensive and thus impractical.

The quest for effective systems that directly impact boundary layers has been a continued focus of aircraft manufacturers, as for example evidenced by U.S. Pat. Nos. 9,278,753 B2 and 9,725,160 B2 assigned to Airbus Operations GmbH, and U.S. Pat. No. 9,157,368 assigned to United Technologies Corporation.

SUMMARY

In accordance with one form of the present disclosure, a fluidic actuator for an airfoil includes a housing configured for being fixed to an airfoil surface. A rotor is contained within the housing, the rotor defined by an interior circumference and an exterior circumference. The rotor includes at least one nozzle extending generally radially through the rotor from the interior circumference to the exterior circumference. At least one nozzle is configured to receive high-pressure air to induce spinning of the rotor within the housing. The fluidic actuator also includes a diffuser through which high-pressure air from the at least one nozzle is cyclically ejected during movement of the rotor.

In accordance with another form of the present disclosure, an airfoil includes a fluidic actuator configured to be fixed to a surface of the airfoil. A rotor is supported within the fluidic actuator, the rotor having an interior circumference and an exterior circumference. The rotor contains at least one nozzle extending radially from the interior circumference to the exterior circumference. The at least one nozzle is configured to pass high-pressure air, having an entry opening at the interior circumference and an exit opening at the exterior circumference. The entry opening is larger than an exit opening. Finally, the fluidic actuator includes a diffuser through which high-pressure air passing through the exit opening is cyclically ejected from the diffuser during movement of the rotor.

In accordance with yet another form of the present disclosure, a method of operating an airfoil to increase lift and reduce aerodynamic drag includes steps of providing an airfoil; forming a fluidic actuator with a rotor and a diffuser, the diffuser fixed relative to the rotor, the rotor including at least one nozzle extending therethrough; and mounting the fluidic actuator to a surface of the airfoil. The method further includes the step of activating the fluidic actuator to pass high-pressure air through the at least one nozzle to move the rotor, wherein high-pressure air is cyclically ejected through the diffuser over a surface of the airfoil.

The features, functions, and advantages disclosed herein can be achieved independently in various embodiments or may be combined in yet other embodiments, the details of which may be better appreciated with reference to the following description and drawings.

It should be understood that referenced drawings are not necessarily to scale, and that disclosed embodiments are illustrated only schematically. Aspects of the disclosed embodiments may be combined with or substituted by one another, and within various systems and environments that are neither shown nor described herein. As such, it should be understood that the following detailed description is merely exemplary, and not intended to be limiting in either application or use.

DETAILED DESCRIPTION

The following detailed description addresses both apparatus and methods for carrying out the present disclosure. Actual scope of the disclosure is as defined in the appended claims.

Figure 1:
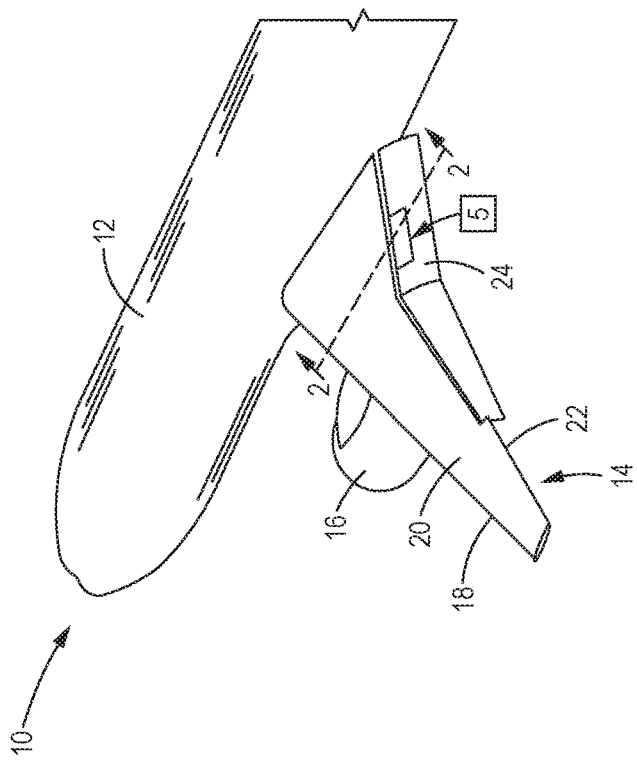
FIG. 1 is a perspective schematic depiction of a partial fuselage and attached wing of a commercial jet aircraft of a type that may include a fluidic actuator configured in accordance with the present disclosure.

Referring initially to FIG. 1, a frontal portion of a commercial jet aircraft 10 is schematically shown as in slow flight, depicting a wing in a configuration as would be utilized during a takeoff or landing. The aircraft 10 includes a main body or fuselage 12, and a pair of wings including left and right wings, only the left wing 14 being shown. The wing 14 extends laterally, or outwardly, of the fuselage 12 in a so-called aft-swept direction typical of modern jet aircraft. Mounted to each wing, including the left wing 14 as shown, is an engine 16. Each wing, including the left wing 14, has a leading edge 18, an upper surface 20, and a trailing edge 22, each of those elements being shown in FIG. 1 with respect to only the left wing 14. Each wing, including the left wing 14, further includes a flap 24.

Figure 2:
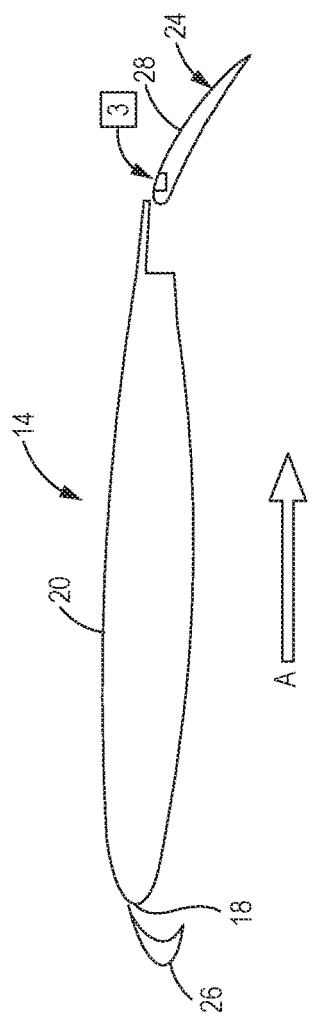
FIG. 2 is a cross-section of the wing, taken along lines 2-2 of FIG. 1, the view including control devices attached to the wing.

Referring now to FIG. 2, a cross-section of the wing 14 is taken inboard of the engine 16 (FIG. 1). The arrow A represents direction of ambient air passing about, i.e. over and below, the airfoil structure of the wing 14, a direction that is opposite of that of the wing during flight. Mounted adjacent the leading edge 18 of the wing 14 is a slat 26. The slat 26 and the flap 24, shown in their enabled or deployed states, are flight control devices that work cooperatively to enhance aerodynamic stability and performance of the wing 14 during slower flight.

Figure 3B:
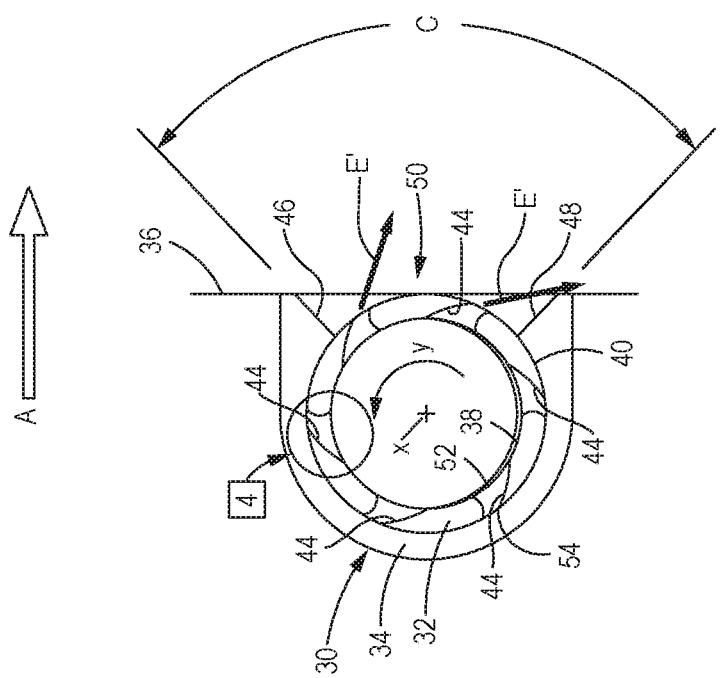
FIG. 3B is a cross-sectional top view of the fluidic actuator, also referenced as block 3 in FIG. 2.
Figure 3A:
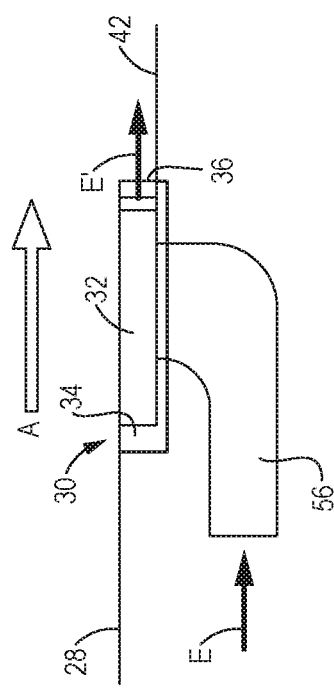
FIG. 3A is a cross-sectional side view of the fluidic actuator, referenced as block 3 in FIG. 2.

Referring now also to FIG. 3A, a fluidic actuator 30, referenced as block 3 in FIG. 2, is mounted within the flap 24, shown near the leading edge (FIG. 2) and just below an upper surface 28 of the flap 24. The fluidic actuator 30 includes a spinning rotor 32 defined by an annular shaped body that is rotatably situated within a housing 34. The rotor is designed to rotate (i.e. spin) within a plane parallel to the upper surface 28. The housing 34 encompasses a circular volume or cavity for supporting the rotor 32, the housing having an edge aligned with a step 36. The step 36 delineates the upper surface 28 from a companion lower portion 42 of the flap 24, the portion 42 designed for unimpeded passage of high pressure air expelled by the rotor 32, as further explained hereinbelow.

Referring now also to FIG. 3B, the rotor 32 includes an interior circumference 38 and an exterior circumference 40, and contains a plurality of nozzles 44 that are spaced about, and which extend generally radially through, the annular shaped body of the rotor 32. In some embodiments of this disclosure, the nozzles 44 may be uniformly spaced.

Figure 4:
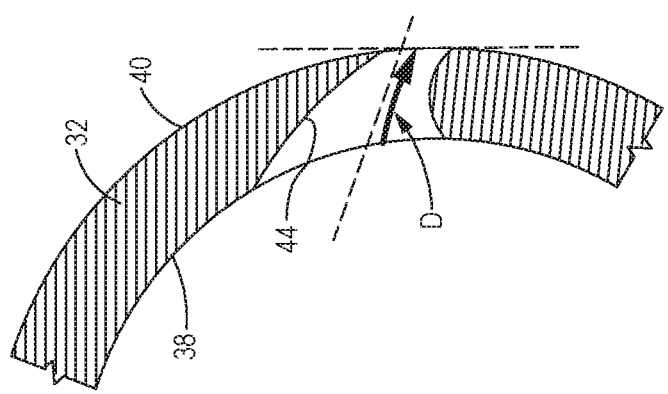
FIG. 4 is an inset portion depicting a nozzle within the fluidic actuator, the inset referenced as block 4 in FIG. 3B.

Referring now also to FIG. 4, in the embodiment of the fluidic actuator 30 of FIGS. 3A and 3B, each nozzle 44 lies substantially within a plane of rotation of the rotor 32. The nozzles operate collectively to induce spinning of the rotor 32 when the rotor is subjected to high-pressure air, represented by an arrow E (FIG. 3A). To the extent the each nozzle provides a curved passageway for airflow, it follows that high-pressure air E' emitted from each nozzle 44 (FIG. 3B), will follow a curved path within the nozzle, as reflected by arrow D (reference each of the curved nozzles 44 depicted in FIG. 4).

The high-pressure air E is shown flowing through a conduit 56 (FIG. 3A), traveling through the center of the annular rotor 32, and out through the nozzles 44 as E'. Referring now particularly to FIG. 3B, each nozzle 44 has an entry opening 52 situated at the interior circumference 38 of the rotor 32, and an exit opening 54 situated at the exterior circumference 40 of the rotor. Each nozzle 44 converges from the entry opening 52 to the exit opening 54, so as to provide high velocity airflow at the nozzle exit opening. As such, each entry opening 52 is approximately twice as large as each exit opening 54.

Continuing reference to FIG. 3B, the housing 34 includes an opening which defines a diffuser 50, through which passes the high-pressure air E' upon its emission from nozzle exit openings 54. The diffuser 50, which is fixed relative to the rotor 32, includes a pair of diverging walls 46 and 48 as shown. An angle of divergence C between the walls 46 and 48 may fall within a range of 30 to 1600, depending upon the particular application. As apparent in FIG. 3A, the diffuser 50, and hence the flow of high-pressure air E' emitted from the nozzle exit openings 54, is oriented or positioned away from the step 36 for an unimpeded flow of the high-pressure air E'.

The rotor spins within the housing 34 via the high-pressure air E, the latter of which may be sourced from jet bleed air from an engine 16. The flow of high-pressure air E' through the angled nozzle exit opening 54 generates torque sufficient to induce spinning of the rotor 32. As the interface between the rotor 32 and the housing 34 is defined by a very small clearance, the majority of the high-pressure air E' from the nozzles 44 will be cyclically ejected from those of the nozzles 44 that are instantaneously exposed to the diffuser 50 during the spinning of the rotor 32.

Figure 5:
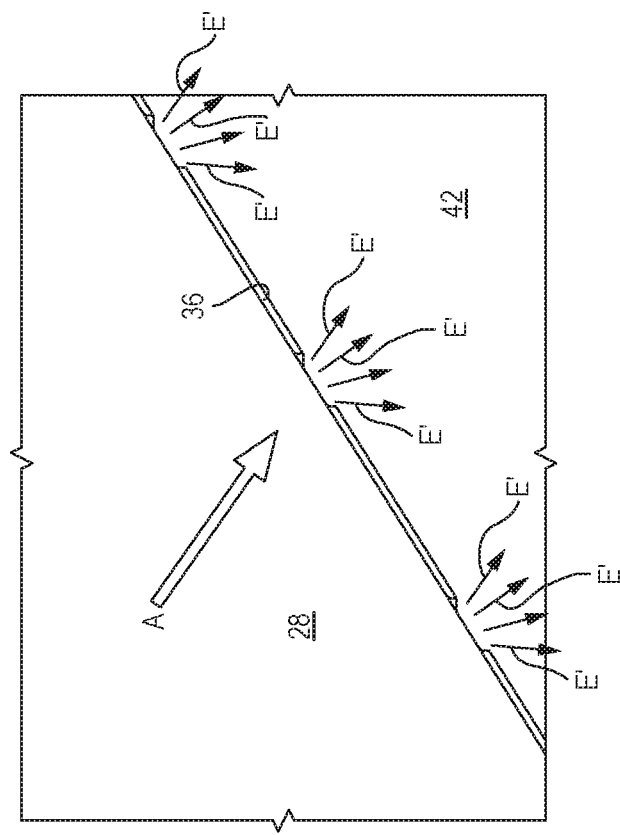
FIG. 5 is an inset portion of an area of a portion of a flap depicted in FIG. 1, the portion referenced as block 5 in FIG. 1.

Referring now also to FIG. 5, application of a plurality of fluidic actuators 30 will provide flows of the high-pressure air E' from a greater plurality of the nozzle exit openings 54, as can be seen passing over the lower portion 42 of the flap 24; i.e. downstream of the step 36. A representative area of left-wing flap 24, utilizing such a plurality fluidic actuators 30, is shown as block 5 in FIG. 1. Although only three separate fluid actuator stations are shown in FIG. 5, the physical number of fluidic actuators 30 being utilized, and their spacing along an airfoil surface, will depend upon desired performance characteristics required of a particular aircraft.

In at least one form of this disclosure, the spinning rotor 32 may turn at a rate of approximately 300 revolutions per second, although exact rate will depend upon a particular application. At this rate of rotation, nozzle ejections can be effective to maintain attached boundary layer flows over an airfoil during slow flight configurations. As disclosed, high-pressure air E may enter the conduit 56 (FIG. 3A) at pressures of less than 150 PSI in some applications, with ejection pressures of high-pressure air E' at the nozzle exit openings 54 as low as 0.5 atmosphere, and as high as nine atmospheres.

As such, the disclosed fluidic actuator 30 is designed to achieve a high air mass momentum via the spinning rotor 32 irrespective of pressure levels, and a plurality of fluidic actuators 30 may be particularly effective to influence associated airfoil boundary layers during slow flight, especially during takeoffs and/or landings. The resultant volume of air E' from the nozzle exit openings 54 can impart significant spatial influence within, and thus enhance aerodynamic effectiveness of, boundary layers passing over the portion 42 of the flap 24.

Figure 6A:
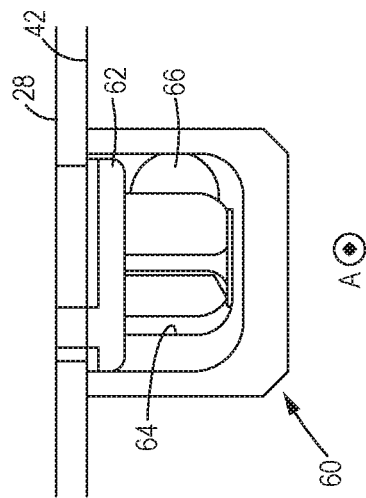
FIG. 6A is a plan view of the fluidic actuator of FIG. 6.
Figure 6C:
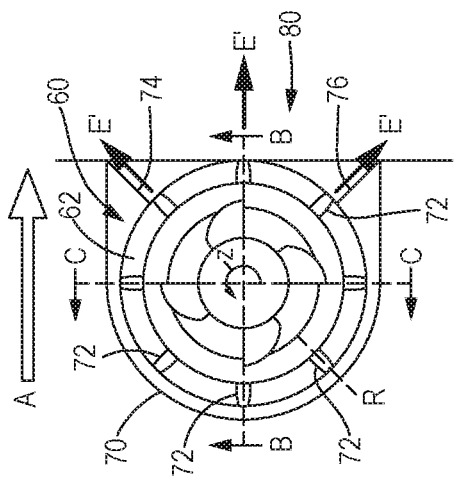
FIG. 6C is another cross-sectional side view of the fluidic actuator of FIG. 6A, taken along lines C-C of FIG. 6A.
Figure 6:
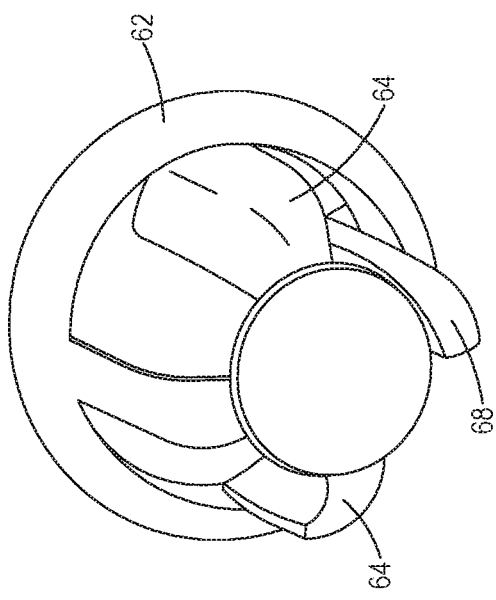
FIG. 6 is a perspective view of another embodiment of a portion of a fluidic actuator configured in accordance with the present disclosure.
Figure 6B:
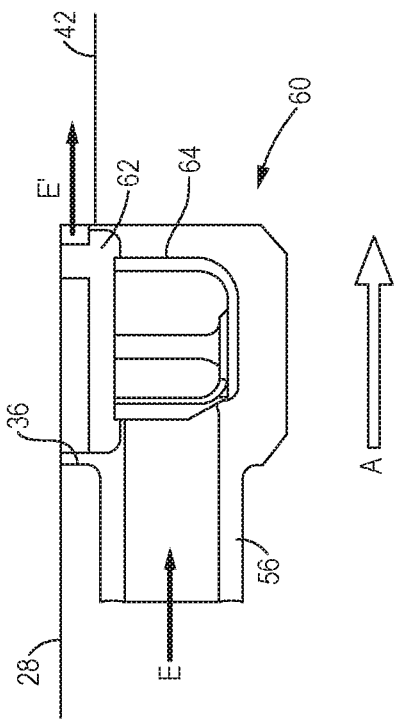
FIG. 6B is a cross-sectional side view of the fluidic actuator of FIG. 6A, taken along lines B-B of FIG. 6A.

Referring now to FIG. 6, another embodiment of the fluidic actuator incorporates a rotor 62 that is driven by the impeller 64, the rotor being fixed to the impeller. Rotary vanes 68 of the impeller 64 are effective to rotate the impeller 64, and hence the rotor 62, via application of high-pressure air E (FIG. 6B). As noted in description of the first embodiment, one source of high-pressure air E may be bleed air from the jet engines 16.

Referring now also to FIG. 6A, similar to the first described embodiment, a fluidic actuator 60 includes a housing 70 that rotatably supports the rotor 62 and impeller 64. In this embodiment, each of the nozzles 72 extend in straight lines, or radially along radius R, as shown, as there is no need for curved nozzles 44 to generate torque for the rotor to turn, as in the previously described embodiment. This is because the impeller 64 includes rotary vanes 68, acted upon by high-pressure air E, to produce torque for spinning of the rotor 62.

FIGS. 6B and 6C, respective orthogonal cross-sectional views of FIG. 6A, show that the embodiment of the fluidic actuator 60 can similarly be placed within earlier described upper surfaces 28 of flaps 24. In the case of the fluidic actuator 60, the body of the combined rotor 62 and impeller 64 can also be placed against the step 36 to achieve similar functioning, including passage of high-pressure air E' over the stepped down or lower surface portion 42 of a flap 24. The impeller 64 includes an inlet 66 (FIG. 6C) through which high-pressure air E (FIG. 3B) may travel to reach the rotary vanes 68 (FIG. 6). The inlet 66 is offset from the center of the impeller 64 to assure that the high-pressure air E impinges directly against the rotary vanes 68.

Also similar to the previously described embodiment, the housing 70 of the fluidic actuator 60 has a diffuser 80 defined by an opening in the housing 70 that includes a pair of diverging walls 74 and 76. Moreover, the diffuser 80 is oriented away from step 36, similar to the previously described diffuser 50.

Finally, a method of operating an airfoil to increase lift and reduce aerodynamic drag may include steps of providing an airfoil; forming a fluidic actuator with a rotor and a diffuser, the diffuser fixed relative to the rotor, the rotor including at least one nozzle extending therethrough; and mounting the fluidic actuator to a surface of the airfoil. The method may further include the step of activating the fluidic actuator to pass high-pressure air through the at least one nozzle to move the rotor, wherein high-pressure air is cyclically ejected through the diffuser over a surface of the airfoil.

The method may further include the step of forming a plurality of convergent nozzles in the rotor, wherein the nozzles extend generally radially through the rotor from an interior circumference to an exterior circumference thereof.

Although not described above, computer logic programs may be installed and implemented for actual operation of the fluidic actuators in a particular aircraft. Moreover, the active enabling and disabling of a system of fluidic actuators may be required only for some flap configurations and angles of attack. In various other flap configurations, the fluidic actuator may remain enabled during slower flight irrespective of angle of attack.

Still other modifications of this disclosure may involve variations on shape of the nozzles 44, 72. For example, while convergent nozzles can achieve only sonic air velocities at their exit openings, supersonic air jet flows may be provided via higher powered fluidic actuators that include combination convergence/divergence nozzles.

The embodiments and features disclosed herein may admit to yet other variations and alternative constructions neither described nor suggested herein. For example, a choice of whether to utilize a retractable fluidic actuator and/or whether to implement actuators with protective doors for example will depend upon constraints of a particular aircraft design, and may be different for new, as opposed to retrofit, implementations, as will be appreciated by those skilled in the art.

What is claimed is:

1. An aircraft fluidic actuator for an airfoil, the aircraft fluidic actuator comprising:
    a housing configured for being fixed to an airfoil surface;
    a rotor contained within the housing, the rotor defined by an interior circumference and an exterior circumference, the rotor including at least one nozzle extending generally radially through the rotor from the interior circumference to the exterior circumference;
    wherein the at least one nozzle is configured to receive high-pressure air at the interior circumference of the rotor to induce spinning of the rotor within the housing;
    wherein the aircraft fluidic actuator further includes a diffuser through which high-pressure air from the at least one nozzle is cyclically ejected during movement of the rotor, wherein the high-pressure air is ejected from the at least one nozzle to the diffuser at the exterior circumference of the rotor, and
    wherein the at least one nozzle converges from an entry opening to an exit opening, the entry opening being larger than the exit opening.

2. The aircraft fluidic actuator of claim 1, wherein the housing encompasses the rotor and includes an opening that defines the diffuser.

3. The aircraft, fluidic actuator of claim 1, wherein the at least one nozzle is curved from the entry opening at the interior circumference to the exit opening at the exterior circumference.

4. The aircraft fluidic actuator of claim 3, wherein the entry opening of the at least one nozzle is at the interior circumference and the exit opening of the at least one nozzle is at the exterior circumference, each nozzle being convergent so as to produce high velocity airflow at the exit opening.

5. The aircraft fluidic actuator of claim 1, further comprising an impeller contained within the housing, and wherein the impeller is fixed to the rotor, and wherein the aircraft fluidic actuator is configured to provide a flow of air into the impeller to induce movement of the rotor.

6. The aircraft fluidic actuator of claim 5, wherein the aircraft fluidic actuator is configured to be positioned substantially flush with an upper surface of the airfoil and adjacent a step thereof that delineates the upper surface from a lower surface of the airfoil.

7. The aircraft fluidic actuator of claim 6, wherein the diffuser is configured to be oriented away from the step to move ejected air directly into a boundary layer of the airfoil.

8. The aircraft fluidic actuator of claim 5, wherein the impeller includes an inlet, and comprises rotary vanes for directing air into the nozzles of the rotor.

9. The aircraft fluidic actuator of claim 1, comprising a plurality of spaced nozzles.

10. An airfoil comprising:
    a fluidic actuator configured to be fixed to a surface of the airfoil;
    a rotor supported within the fluidic actuator, the rotor having an interior circumference and an exterior circumference, the rotor containing at least one nozzle extending radially through the rotor from the interior circumference to the exterior circumference;
    wherein the at least one nozzle is configured to pass high-pressure air;
    wherein the at least one nozzle has an entry opening at the interior circumference and an exit opening at the exterior circumference;
    wherein the at least one nozzle converges from the entry opening to the exit opening, the entry opening being larger than the exit opening; and
    wherein the fluidic actuator includes a diffuser through which high-pressure air exiting the rotor through the exit opening is cyclically ejected from the diffuser during movement of the rotor.

11. The airfoil of claim 10, wherein the actuator further including a housing, and wherein the housing is mounted to an upper surface of the airfoil, and wherein the housing encompasses the rotor and includes an opening that defines the diffuser.

12. The airfoil of claim 10, wherein the fluidic actuator comprises a plurality of nozzles, and wherein the actuator is configured to be activated during takeoffs or landings.

13. The airfoil of claim 10, wherein an impeller is mounted within the housing, the impeller fixed to the rotor, and wherein the fluidic actuator is configured to provide a flow of air into the impeller to induce movement of the rotor.

14. The airfoil of claim 10, wherein the fluidic actuator is positioned above a lower surface of the airfoil and adjacent a step thereof that delineates the lower surface from an upper surface of the airfoil.

15. The airfoil of claim 14, wherein the diffuser is oriented away from the step to move ejected air directly into a boundary layer of the airfoil.

16. The airfoil of claim 10, wherein the impeller includes an inlet and comprises vanes for directing air into the nozzles of the rotor.

17. The airfoil of claim 10, wherein the at least one nozzle extends from the entry opening at the interior circumference to the exit opening at the exterior circumference, such that orientation of the nozzle is aligned with a radius of the rotor.

18. The airfoil of claim 10, wherein the airfoil is a flap attached to an aircraft wing.

19. A method of operating an airfoil to increase life and reduce aerodynamic drag, the method comprising steps of:

providing an airfoil;

forming a fluidic actuator with a rotor and a diffuser, the diffuser fixed relative to the rotor, the rotor including at least one nozzle extending therethrough;

mounting the fluidic actuator to a surface of the airfoil;

activating the fluidic actuator to pass high-pressure air through the at least nozzle to move the rotor, wherein high-pressure air is cyclically ejected through the diffuser over a surface of the airfoil; and forming the at least one nozzle to converge from an entry opening to an exit opening, the entry opening being larger than the exit opening.

20. The method of claim 19, further comprising forming a plurality of convergent nozzles in the rotor, wherein the plurality of convergent nozzles extend generally radially through the rotor from an interior circumference to an exterior circumference thereof.

* * * * *